April 15, 1947.  C. W. GIBBS  2,418,829
ROTARY MOTOR
Filed Sept. 30, 1943  2 Sheets-Sheet 1
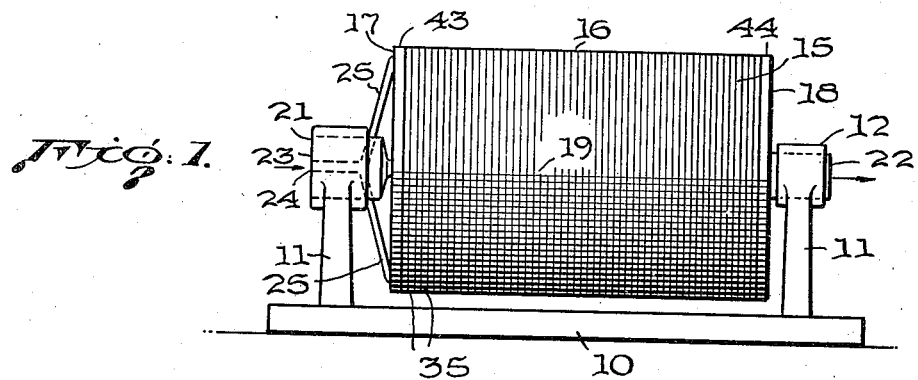
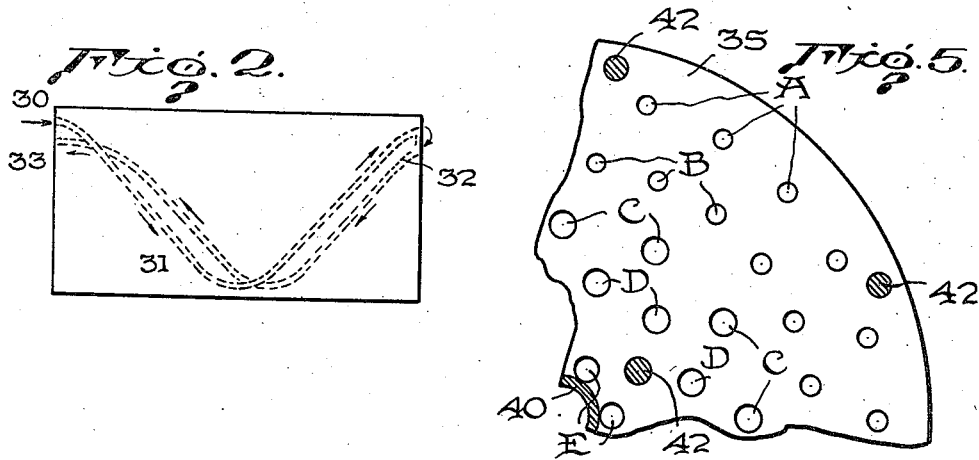
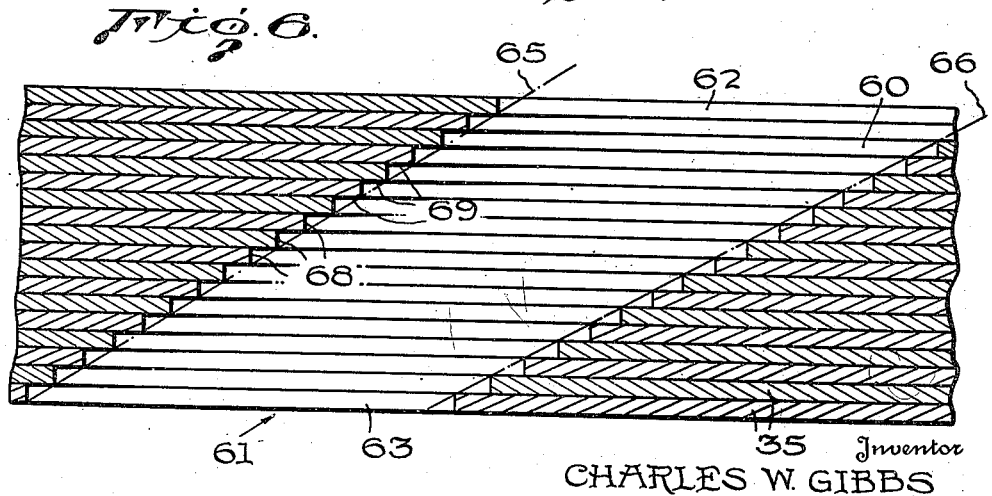
Inventor
CHARLES W. GIBBS
By Leech & Radue
Attorneys April 15, 1947.  C. W. GIBBS  2,418,829
ROTARY MOTOR
Filed Sept. 30, 1943  2 Sheets-Sheet 2
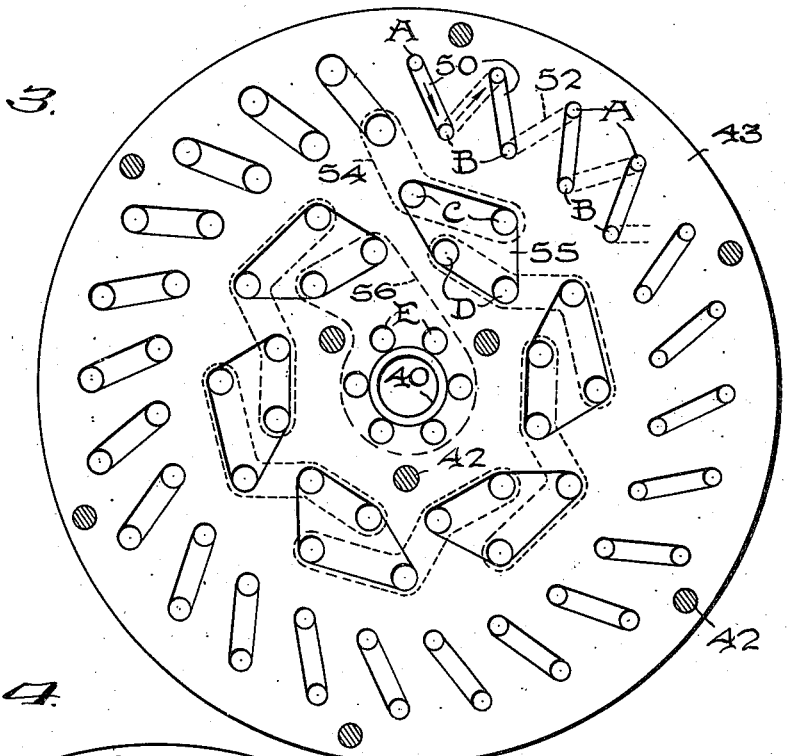
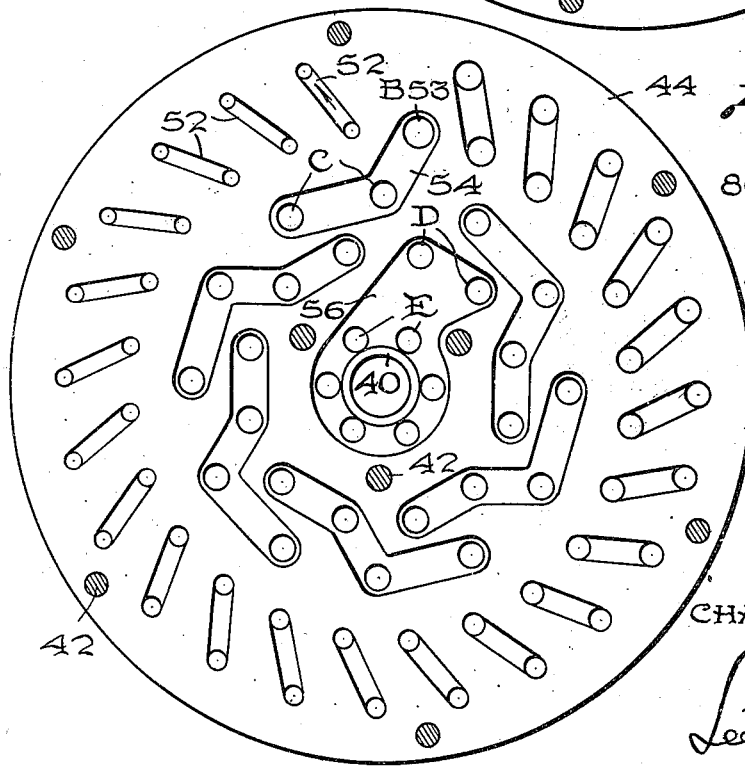
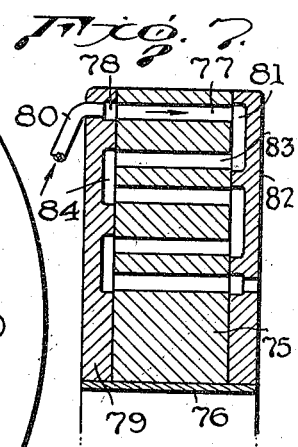
Inventor
CHARLES W. GIBBS
Leech & Radue
Attorneys Patented Apr. 15, 1947

2,418,829

UNITED STATES PATENT OFFICE 2,418,829

ROTARY MOTOR

Charles William Gibbs, Chevy Chase, Md.

Application September 30, 1943, Serial No. 504,477

6 Claims. (Cl. 253—65)

This invention relates to rotary motors and more particularly to such motors in which a rotor, mounted in suitable bearings, is adapted to be driven at high speed by the action of high pressure expandible fluid, supplied thereto without the aid of a stationary casing, and exhausted therefrom at a low pressure and low velocity.

The general object of the present invention consists in the provision of a novel and improved rotary motor of the type outlined.

More particularly it is an object of the invention to provide a rotor, for a motor of the type described, including a conduit for the expansion of a high pressure fluid which conduit is composed of a large number of serially arranged passages extending from end to end of the rotor, each with at least a helical component in such a direction that when combined with the direction of fluid flow therein it contributes to the rotational effort imparted by movement of the fluid in all of the other passages of the rotor.

Another object of the invention consists in an improvement for rotors for motors of the type described including the arrangement of a plurality of end to end passages in a body of revolution, which passages are arranged in circumferential layers, those of adjacent layers having opposed helical twists while all passages in any one layer advance in the same direction, together with means at the ends of the rotor for connecting into a continuous conduit all of said passages through which an expansible fluid flows in such order that its action in each passage to rotate the rotor is cumulative.

An important feature of the invention consists in the formation of the rotor from a plurality of very thin laminae strung and clamped upon a central rotatably mounted shaft, each lamination being provided with a plurality of holes therethrough so arranged and disposed that when assembled the holes assume a stepped or echelon relation to provide the aforesaid end to end passages each with a helical component.

A further important feature of the invention consists in the assembly of a rotor of the type described from a plurality of thin metal laminae each including a plurality of spaced straight-through holes, arranged on concentric circles, the holes in the several disks being so disposed, that, in the assembly, those in adjacent circles or circumferential layers are in opposite echelon to form passages extending from end to end of the rotor with opposed helical components.

A still further important feature of the invention resides in the provision of a laminated rotor, as defined above, together with end plates including ducts for alternately connecting fluid passages of opposite twist into a continuous conduit, some of said ducts being arranged to include two or more passages in multiple as a series element in the conduit whereby the effective conduit cross sectional area may be increased to accommodate the expansion of the high pressure fluid medium without unduly enlarging the size of any individual passage.

Other and further features and objects of the invention will be more apparent to those skilled in the art upon the consideration of the accompanying drawings and following specification wherein are disclosed several exemplary embodiments with the understanding that such combinations thereof and modifications of the same may be made as fall within the scope of the appended claims without departing from the spirit of the invention.

In said drawings:

Fig. 1 is a side elevation of one form of motor constructed in accordance with the present invention.

Fig. 2 is a phantom view illustrating the partial path of the fluid from one end to the other and return in the rotor.

Fig. 3 is an inner face view of one of the end plates of the rotor showing in solid lines the ducts for transferring the fluid from the right hand to the left hand passages and showing in dotted lines the arrangement of the ducts on the opposite end member.

Fig. 4 is an inner face view of the opposite end member.

Fig. 5 is a fragmentary elevation of one of the laminae and the supporting shaft.

Fig. 6 is a fragmentary longitudinal section of a fluid passage, shown on a magnified scale, illustrating the echelon arrangement of the holes in the disks forming the same and showing, greatly exaggerated, the increasing cross sectional area of each passage to accommodate the expanding fluid medium; and Fig. 7 is a fragmentary longitudinal central section through a modified form of rotor.

The motor of the present invention is of extreme simplicity in that it includes only a unitary rotor, preferably shaped as a figure of revolution, and having shafts (preferably hollow) extending from the two ends for rotatably supporting the same on its axis. Any suitable form of base and stationary bearings is provided for these shafts.

The rotor is driven at high speed under the action of a continuous stream of expansible high pressure fluid introduced into a conduit of gradually increasing cross section having multiple passages leading sinuously through the rotor. The fluid is preferably introduced through one of the hollow shafts and desirably expends its full energy in driving the rotor, being exhausted preferably through the other hollow shaft at reduced and preferably atmospheric pressure and zero relative velocity.

The expansible fluid which may be compressed air, steam, an exploded mixture of air and fuel or any other suitable propellant gas is continuously and preferably uniformly expanded in its passage through the conduit in the rotor. The conduit through the rotor is composed of a plurality of passages arranged preferably in series and each extending from end to end of the same. Each of the passages has at least a helical component in such a direction, in respect to the direction of fluid flowing through the same, that the increments of rotational energy imparted to the rotor from the movement of the fluid through these passages are cumulative.

There are two aspects to the invention, the first being the arrangement and disposition of the passages whereby the gas shuttles back and forth through the rotor in one or more conduits each composed of a series of the said passages and, the second in the simple means for achieving the curved passages through the rotor by forming the latter from a plurality of thin laminae each provided with a plurality of suitably shaped apertures arranged in echelon to form passages having serrated walls. These serrations can be removed after assembly, if desired, such as by means of sand blasts introduced into the passages.

Referring now to the drawing, there is shown in Fig. 1 an elementary form of the invention which serves to illustrate its principle. At 10 is shown any suitable form of rigid base from which a pair of pillars 11 support bearings 12.

The only movable portion of the motor is the rotor 15 here shown for the sake of simplicity as of cylindrical form having the curved outer surface 16 and the substantially flat ends 17 and 18 disposed radially to the axis 19. Extending from the two ends of the rotor are shafts 21 and 22 coaxial with the axis 19. They may be enlarged extensions of a through shaft and are journalled in the bearings in any suitable manner to permit free rotation. Since a motive fluid must be introduced and withdrawn from the rotor it is preferred to have the two shaft ends hollow. In the event that heated fluid is used the hollow entrance shaft 21 is provided with a mass of insulation 23 surrounding the fluid passage 24 therein in order to prevent overheating the lubricated surface of the bearing. The exhaust passage through the shaft 22 may not be so treated since the temperature will be materially reduced at the exhaust. A pair of pipes 25 are shown radiating from the tube 24 on the rotor side of the bearing to conduct fluid to passages near the periphery of the rotor. In some of the embodiments a single pipe will be suitable for this purpose whereas in others one or more with or without manifolds may be required as will appear when the description proceeds.

In the preferred form of the invention the conduit extending between the entrance and exit ports makes many passages through the rotor. If the rotor is cylindrical, as shown, each of these passages is a helix. A plurality of passages are arranged in each of a number of coaxial circumferential layers. Each passage for the purpose of this present description is illustrated as composed of substantially one complete turn of 360° about the axis but obviously partial or multiple turns may be comprised in each passage in accordance with the rate of expansion desired, the speed required from the rotor and a number of other factors some of which may have to be determined experimentally.

Fig. 2 illustrates in a phantom view the manner of connecting several helical passages in series to form a portion of the conduit for the expandible fluid. It is assumed that the passages illustrated in this figure are in the two outermost layers of passages. Fluid enters through the opening 30 in the left hand end of the rotor as illustrated by the arrow, moves clockwise helically around through the outer passage 31 until it reaches the right hand end where it is turned, by means later to be described, reenters an inner passage 32, which has a counterclockwise pitch as observed from the left hand or entrance end, and passes oppositely through the rotor to exit at 33. It is then conducted to the next adjacent right hand passage in the outer layer, moves across to the right hand end then inwardly to the second layer and passes through the left hand passage adjacent to 32 and so on, shuttling back and forth across the rotor until all of the outer two layers of passages have been traversed. If there is still energy available in the fluid it may then be passed inwardly to follow the same procedure in the next two inner layers of passages again arranged alternately right and left hand.

In order to use the energy available from the expanding fluid to obtain the greatest power it is desirable that each passage increase in cross sectional area from entrance to exit and that each successive passage be somewhat larger in cross sectional area than the preceding one. This is taken care of in each layer by so designing the passages but if it is desired to use a set of layers inside of the first and second outer layers just described, it may be found desirable, instead of making the individual passages so large, to use two or more in parallel and to arrange the groups in series in the whole conduit system. Any further inward layers may be used in parallel with a greater number of passages joined together.

By reversing the direction of flow of the fluid each time it reaches an end of the rotor the respective end thrusts resulting from the action of the fluid on the walls of the passages counteract each other and the bearings are substantially relieved of longitudinal thrust reactions.

While Fig. 5 has been primarily intended to illustrate one element of a laminated rotor it may also be considered as a cross section through the rotor at either end for illustrating the arrangement of the passages. Thus the outer row of holes A will be seen to be increasing in diameter in a clockwise direction. The same is true of the holes B in the second circle thereof. Any two adjacent passages A and B in Fig. 5 may be considered as 31 and 32 in Fig. 2. The holes C in the third row are of a size dictated by the largest holes in rows A and B which are not shown since they occur near the ends of the series of holes in the circles. Holes in row D are substantially the same as those in row C since they constitute the return passages. A final circle of holes E are preferably all used in parallel and their sizes may be dictated by their combined capacity in respect to the capacity of the holes in rows C and D.

Since it is obviously difficult if not impossible to provide the plurality of helically disposed passages in the rotor by any known method of machining, it is desired to form the rotor from a large number of relatively thin laminae. It is proposed for instance, in rotors which may be of the order of one foot in diameter to use metal sheets not thicker than 30 thousandths of an inch. As a rough formula for determining the thickness of the sheets it may be assumed that they should not be thicker than one third of the circumferential dimension of the smallest hole in any disk. These sheets may be of ferrous or nonferrous metal having adequate strength to resist the pressures and centrifugal forces encountered. They are strung on the central shaft such as shown at 40 in Fig. 5 and tightly clamped together. Bolts as shown at 42 may extend longitudinally through appropriate openings in the laminae for this clamping which may be augmented by spot welding or the like in order to insure the proper disposition of the several elements. The disks are made perfectly flat and without burrs to insure fluid tightness between them, which may have to be augmented by the use of some sealing compounds if found desirable.

It will be appreciated that where laminae such as these are used the passages can be readily formed by holes drilled, punched or otherwise formed in appropriate positions in the laminae which will line up in the assembly to provide the continuous passages with the desired helical components.

For the sake of simplicity in manufacture the holes can be circular but if the pitch of the helix is considerable this will reduce the width of the passage normal to its axis because of the echelon disposition of the disks to achieve this helical arrangement. The passage cuts across each disk at an angle of intersection dependent upon the pitch of the helix and a punched circular hole in the disk will serve to narrow the passage. In order to have a circular passage normal to its axis, the holes in the disks normal to their faces would have to have a width equal to the cosecant of the angle times the normal diameter of the passage.

A rotor of approximately 24 inches in length would be formed of about 800 disks of the thickness previously mentioned. Each end of the rotor, through which all of the passages enter or emerge, is covered by an end plate 43, 44 of considerable thickness, and this end plate is provided with a plurality of connecting ducts which serve to direct the fluid as it emerges from one passage into the adjacent passage of counter pitch, so that the fluid is caused to shuttle back and forth through the oppositely directed passages of two adjacent layers. These end plates also provide ducts to transfer the fluid from the last passage in one of the layers to the first passage or passages in the next adjacent inner layer.

Referring now to Fig. 3, which illustrates in full lines one of the end members, and making use of the same symbols for passages as used in Fig. 5, it will be seen that the exit end of each of the passages in outer row A is connected by a groove or duct 50 to the nearest passage B in the second ring of passages. The dotted line ducts 52, which are shown solid in the opposite end ring of Fig. 4, then transfer the fluid back, as it emerges from B, to the next adjacent A passage in clockwise direction around the rotor. This continues for the full series of passages in rows A and B. The last passage in row B is shown at B53 and a transfer duct 54 of irregular shape connects this to two adjoining passages in row C, as seen in Fig. 4. The fluid leaving these passages C then enters the quadrilateral chamber 55 of Fig. 3, which joins the outlets of the mentioned two C passages to the entrances to two adjacent passages D.

It will be seen that the ducts just described serve to place two C passages and two D passages, each in parallel into the series of passages previously used to form the full conduit through the rotor. It has previously been noted that it is desirable to thus use passages in series multiple arrangement to avoid unduly enlarging the diameters of the individual passages while permitting increase in their aggregate cross sectional area to accommodate the expanding fluid.

This principle is further carried out when the fluid leaves the last pair of passages D, for it is then delivered by a manifold-like duct 56, best seen in Fig. 4, to six passages E, all of the same size and closely distributed about the shaft 40. This shaft has been shown hollow for the sake of lightness, but it will be understood it does not provide a straight through passage from the entrance 24 to the exhaust 22. The drawings do not illustrate, but the exhaust from the passages E are gathered by an appropriate manifold and delivered to the discharge hollow shaft through the opening 22 for final disposition.

It will be appreciated that the end plates as illustrated are solely for the purpose of describing one embodiment of the invention, for it is clear that other arrangements for passing the fluid through the several passages may be found more desirable in certain specific cases. The passages as defined in connection with Figs. 3 and 4 are all joined in what may be considered a single conduit from which the gas passes from the single inlet of the rotor to its exhaust. It is clear that several conduits may be desirable and Fig. 1 illustrates feed pipes 25 for at least two of them. They would be arranged to have parallel paths always disposed 180° apart throughout the rotor for purposes of balance. In some cases it might be possible, by elongating the rotor, to extract all of the power from the expanding fluid in one single pass throughout the length of the passages in which case all of the passages would be connected in parallel and fed from a manifold at the inlet end.

In keeping with the above it will also be appreciated that the rotor need not be of cylindrical form but may be, for instance, frusto-conical, in the shape of a double cone, or provided with a stepped or longitudinally curved outer surface. Various other forms suggest themselves, and in many of these the passages would have not only the desired helical components but certain spiral-like components, all of which can be carried out with great facility by the method of assembling pre-punched laminae, as described. It will also be understood that further embodiments involving different arrangements and dispositions of the passages in the form of one or more conduits is contemplated.

In the construction of the passages it is highly desirable, where they are arranged in circumferential layers of uniform diameter throughout their length, to so vary the cross sectional area of each passage as to give a mean constant velocity of elastic fluid in any one of them, and this requires that the passage increase in area very slightly, since the reduction in pressure on account of the work done in any single passage will, in most cases, not be great. The design of the transfer ducts should be such as to prevent any sudden changes in velocity of the gas when moving in or out between the several layers.

Obviously the most satisfactory arrangement for supplying and exhausting the fluid is through the hollow central shafts, but in cases where the high pressure is imparted to the elastic fluid by burning or otherwise heating the same to a high temperature some consideration must be given to temperature losses in the design and operation of the motor. Where the operating medium is the combustion gas from a fluid fuel, it seems preferable to have the inlet to the rotor near its periphery and to expand the gas toward the center of the rotor as explained previously. Where steam or superheated steam is used the efficiency may be higher if the steam is introduced as near as possible to the rotor axis and continuously expanded in passages further and further from its axis. In this manner the lower pressure steam in the outer passages acts as jackets for the higher temperature and pressure steam in the inner passages and prevents its too rapid cooling.

A further specific embodiment of the invention is illustrated in Fig. 7 where all of the passages in any one circumferential layer are connected in parallel so that the fluid flows always in one direction and simultaneously in all passages in each layer but is reversed in direction from layer to layer. The rotor body 75 is laminated as previously described and while the several passages therethrough have been illustrated for the sake of convenience as parallel to the central shaft 76, they nevertheless have the spiral component heretofore described and alternate layers have these components in opposite directions. The outermost layer of passages is composed of a number like that illustrated at 77 and they are all connected together at the left hand or inlet end by a manifold 78 in the end plate 79. This manifold is an annular groove and it may be connected at one or more points by means of a tube 80 to the hollow inlet shaft as previously described. After the fluid has passed through the outer layer of passages 77 it is received in an annular groove 81, in end plate 82 at the right hand side of the rotor, which leads it into the second layer of passages 83 where it passes from right to left and is then reversed by the annular groove 84 for delivery to the next inner layer of passages. This arrangement continues throughout any desired number of layers until the fluid is finally exhausted through one of the end plates. It may be conducted to the hollow exhaust shaft, if desired, in any convenient manner. It will be appreciated that the cross sections or numbers of the tubes in the successive layers are varied as required to permit the continuous expansion of the elastic fluid from inlet to exhaust. The rotor in this construction will desirably be of considerable length to extract all of the power from the expanding fluid.

Referring now to Fig. 6, there has been illustrated a plurality of the laminae 35 in much exaggerated size, the illustration being a cross section through the axis of one of the fluid passages 60 with the entrance end indicated at 61 and the exhaust at 62. Each of the laminae is provided with a suitable shaped aperture or hole 63 and these holes increase in diameter or width from the inlet toward the exhaust, as clearly illustrated by the lines 65 and 66, each just in contact with each wall tip. The holes, by proper disposition of the laminae, are disposed in echelon, and while they form a continuous passage diagonal to the inner faces of the laminae this passage does not have smooth side walls but is rather defined by stepped or serrated walls each composed alternately of the straight through edges 68 forming the walls of the holes and the flat portions 69 forming a section of the face of the successive laminae exposed by the overlapping relationship required to obtain the pitch of the passage.

It is considered that at certain velocities and with certain types of fluids that this slight roughness of the walls will assist rather than hinder in the extraction of power from the moving fluid. In the case of certain velocities, such serrations may be deemed undesirable and can be removed after assembly by sand blasting or can be largely eliminated by proper punching, reaming and the like in the initial formation of the openings in the individual disks.

Fig. 6 illustrates one of the fundamental features of this invention, that is, the use of thin disks in the construction of the rotor and the formation of the passages in the same by cutting away portions of the disks in such a manner that when assembled these cooperate to provide passages for confining the elastic fluid and directing it in such a manner as to effect rotation of the rotor and thereby the extraction of energy from the fluid, which will be converted into power for delivery for useful purposes.

What I claim is:

1. A rotor for a rotary motor of the type described and through which a plurality of continuously expanding generally longitudinal passages extend from end to end, said rotor comprising a member of the order of hundreds of thin contiguous laminae extending at right angles to the axis of rotation of the rotor, each lamination having therein a plurality of straight through holes, each to form a portion of one of said passages, said laminae being arranged so that cooperating holes in adjacent discs are circumferentially offset by an amount which causes each passage to have a desired amount of pitch or twist about the said axis of rotation, the holes in each lamination being arranged with their centers on circles concentric with said axis, the cross sectional areas of the holes in any one circle progressively increasing about the circle, said circles of holes occurring in adjacent related pairs with the holes in the two circles of a pair alternately included in the progressive area increase.

2. A rotor for a rotary motor of the type described and through which a plurality of continuously expanding generally longitudinal passages extend from end to end, said rotor comprising a number of the order of hundreds of thin contiguous laminae extending at right angles to the axis of rotation of the rotor, each lamination having therein a plurality of straight through holes, each to form a portion of one of said passages, said laminae being arranged so that cooperating holes in adjacent discs are circumferentially offset by an amount which causes each passage to have a desired amount of pitch or twist about the said axis of rotation, the holes in each lamination being arranged with their centers on circles concentric with said axis, the cross sectional areas of the holes in any one circle progressively increasing about the circle, said circles of holes occurring in concentric adjacent related pairs with the holes in the two circles of a pair alternately included in the progressive area increase, the pitch of the passages in adjacent circles being opposite, and means at each end of the rotor providing ducts connecting the passages of adjacent rings alternately into one sinuous conduit for continuous effective fluid expansion.

3. A rotor for a rotary motor of the type described and through which a plurality of continuously expanding generally longitudinal passages extend from end to end, said rotor comprising a number of the order of hundreds of thin contiguous laminae extending at right angles to the axis of rotation of the rotor, each lamination having therein a plurality of straight through holes, each to form a portion of one of said passages, said laminae being arranged so that cooperating holes in adjacent discs are circumferentially offset by an amount which causes each passage to have a desired amount of pitch or twist about the said axis of rotation, the holes in each lamination being arranged with their centers on circles concentric with said axis, the cross sectional areas of the holes in any one circle progressively increasing about the circle, said circles of holes occurring in concentric adjacent related pairs with the holes in the two circles of a pair alternately included in the progressive area increase, the pitch of the passages in adjacent circles being opposite, means at each end of the rotor providing ducts connecting the passages of adjacent rings alternately into one sinuous conduit, and means connecting the last passage of the innermost ring of the pair to the first passage of the next innermost pair of rings.

4. A rotor as defined in claim 2 in which the passages of certain of the inner rings are connected in multiple-series in the conduit to increase their fluid carrying capacity while keeping the individual holes in the laminae of relatively small size.

5. A rotor for a motor of the type described, said rotor comprising a shaft-mounted figure-of-revolution, a plurality of passages for the expansion of fluid extending through said rotor from one end face to the other said passages being arranged in sets in coaxial layers, each set comprising a plurality of passages, each passage being curved to at least a generally helical form with the twist of all passages in any one layer alike and all of those in adjacent layers being of opposite twist, said rotor being assembled from a plurality of circular laminae each not thicker than about forty-thousandths of an inch, each lamination having a straight through hole therein for each passage in said rotor, the holes in adjacent discs being sufficiently offset in the proper direction to provide the desired twist to all passages, and end plates on and movable with said rotor having ducts for serially connecting said passages of alternate twist into a continuous conduit, the passages in the two outer layers being alternately included in said conduit.

6. A rotor for a motor of the type described, said rotor comprising a shaft-mounted figure-of-revolution, a plurality of passages for the expansion of fluid extending through said rotor from one end face to the other, said passages being arranged in sets in coaxial layers, each passage being curved to at least a generally helical form with the twist of all passages in any one layer alike and all of those in adjacent layers being of opposite twist, said rotor being assembled from a plurality of circular laminae each not thicker than about forty-thousandths of an inch, each lamination having a straight through hole therein for each passage in said rotor, the holes in adjacent discs being sufficiently offset in the proper direction to provide the desired twist to all passages, and end plates on said rotor having ducts for serially connecting passages of alternate twist into a continuous conduit, said ducts in one end plate delivering from each outer layer to the next inner one and in the other end plate delivering in the opposite direction, the holes in said laminae being so sized that said conduit progressively increases in cross-sectional area from end to end of each passage and from entrance to exhaust.

CHARLES WILLIAM GIBBS.

REFERENCES CITED

The following references are of record in the file of this patent:

UNITED STATES PATENTS

| Number | Name | Date |
|---|---|---|
| 476,451 | Elrick | June 7, 1892 |
| 831,558 | Limberg | Sept. 25, 1906 |
| 737,734 | Graydon | Sept. 1, 1903 |
| 824,449 | Stuart | June 26, 1906 |
| 2,001,800 | Silbermann | May 21, 1935 |
| 1,826,453 | Coffman | Oct. 6, 1931 |
| 436,417 | Hammesfahr | Sept. 16, 1890 |
| 702,461 | Nadrowski | June 17, 1902 |

FOREIGN PATENTS

| Number | Country | Date |
|---|---|---|
| 473,714 | British | Oct. 19, 1937 |